United States Patent [19]
Zorn

[11] Patent Number: 4,463,471
[45] Date of Patent: Aug. 7, 1984

[54] WIPING DEVICE FOR WINDOW PANES OF A MOTOR VEHICLE

[75] Inventor: Güenter Zorn, Buehl, Fed. Rep. of Germany

[73] Assignee: Robert Bosch GmbH, Stuttgart, Fed. Rep. of Germany

[21] Appl. No.: 427,266

[22] Filed: Sep. 29, 1982

[30] Foreign Application Priority Data

Jun. 5, 1982 [DE] Fed. Rep. of Germany ....... 3221391

[51] Int. Cl.$^3$ .............................................. B60S 1/32
[52] U.S. Cl. .............................. 15/250.19; 15/250.35; 403/84; 403/111
[58] Field of Search ........... 15/250.19, 250.34, 250.35, 15/250.31, 250.32; 403/84, 111, 146

[56] References Cited

U.S. PATENT DOCUMENTS 2,130,186  9/1938  Jacobs .............................. 403/146 X

FOREIGN PATENT DOCUMENTS 1058382  5/1959  Fed. Rep. of Germany ... 15/250.35

Primary Examiner—Edward L. Roberts
Attorney, Agent, or Firm—Michael J. Striker

[57] ABSTRACT

Disclosed is a wiping device having a support member which is mounted for oscillating about an axis. A blind passage is formed in the support member in a direction transverse to the axis. A wiper arm supporting at its free end a wiper blade holder, is inserted at its other end into the elongated passage of the support member so as to be rotatable about its axis and to be displaceable in axial direction. A spring-biassed locking member, for example in the form of a pyramidal plug is attached to the end of the wiper arm in a passage and is urged into a matching recess to hold the wiper arm in a working position or when the wiper arm in the plug is displaced from the locking socket to permit the rotation of the wiper blade holder about the axis of the wiper arm.

17 Claims, 5 Drawing Figures

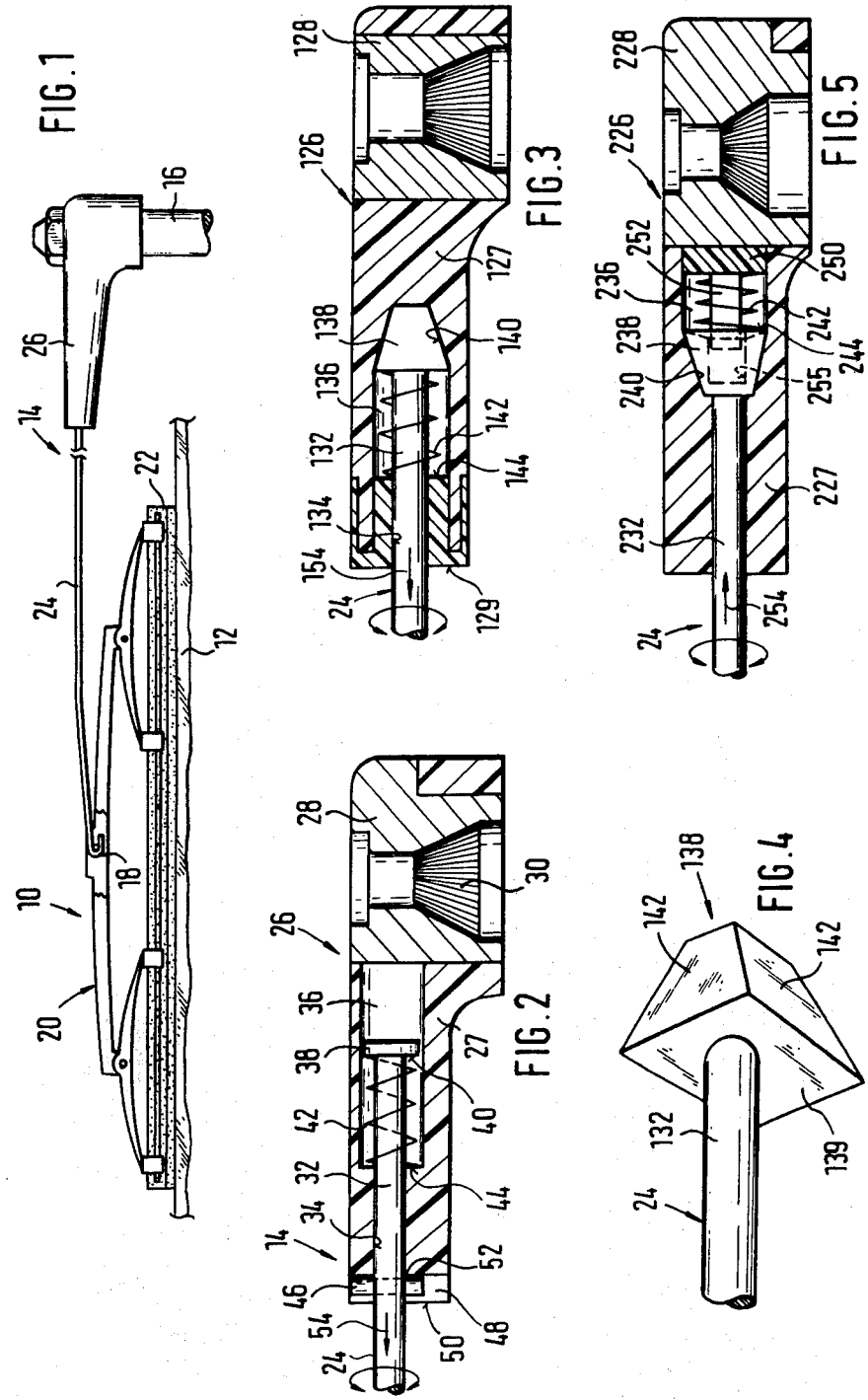

WIPING DEVICE FOR WINDOW PANES OF A MOTOR VEHICLE

BACKGROUND OF THE INVENTION

The present invention relates in general to a window wiper for use in motor vehicles and in particular to a wiping device of the type having a support member rotatable about an axis, a wiper arm connected at one end thereof to the support member and extending outwardly to the axis and being releasably connected at its free end to a wiper blade holder.

From the prior art a wiping device is known in which the joint is provided on the wiper arm which carries the wiping element so that the wiper blade can be swung away from the window pane when the wiper element is to be exchanged. This known wiping device, however, does not permit the proven hook pipe joint between the wiper blade holder and the wiper arm because in order to release the wiper blade the latter must no longer be in contact with the window pane.

SUMMARY OF THE INVENTION

An object of the present invention is to overcome this disadvantage.

In particular, it is an object of the present invention to provide an improved wiping device which does not require a joint on the wiper arm for swinging away the wiper blade from the pane when an exchange of the wiper blade is desired.

In keeping with this object, and others which will become apparent hereinafter, one feature of the invention resides in the provision of a support member which is rotatable about an axis and provided with an elongated passage extending transversely to the axis, a wiper arm projecting at one end thereof into the passage and being rotatable therein about its center axis, and securing means arranged in the passage for releasably arresting the wiper arm in a fixed position relative to the support member.

In this manner the construction of the device according to this invention has the advantage in comparison with prior-art device using the swing-up joint that upon releasing the securing means in the support member for the wiper arm, the latter can be rotated about its center axis into a position in which the wiper blade carrier is rendered exchangeable without the necessity of swinging up the wiper arm. In the preferred embodiment, the securing means includes a non-circular socket formed in one end of the passage in the support member, and a corresponding non-circular plug secured to the one end of the wiper arm and being spring-biassed into the socket to hold the wiper arm in the fixed working position and being removable from the socket by axially displacing the wiper arm against the biasing spring to a position in which the wiper arm is freely rotatable.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a plan view of the wiping device according to this invention;

FIG. 2 is a sectional view of a support member for the wiper blade in the device of FIG. 1, shown on an enlarged scale and including one embodiment of this invention;

FIG. 3 is a view similar to FIG. 2 and including a modified version of this invention;

FIG. 4 is a perspective view of a cut-away part of the wiper arm in the embodiment according to FIG. 3; and FIG. 5 is a view similar to FIG. 3 and showing a further modification of this invention.

DESCRIPTION OF THE PREFERRED EMBODIMENTS

Referring firstly to FIG. 1, there is illustrated a general outlook of the wiping device 10 of this invention. The device includes a support member 26 attachable to a driving shaft 16 which rotates the same back and forth about its axis. A wiper arm 24 projects at one end thereof into the support member 26 in a direction transverse to the axis of rotation. The free end of the wiper arm is terminated with a hook-shaped joint 18 swingably supporting a holding arm 20 for a wiper blade 22. The wiper arm 24 is resiliently biassed to urge the holder 20 with wiper blade 22 against a window pane 12 of a non-illustrated motor vehicle. The end 14 of the wiper arm 24 which projects into the support member 26, has a circular cross-section so that it is both rotatable and axially displaceable relative to the support member.

In the embodiment according to FIG. 2, the support member includes a base body 27 of a plastic material into which a metal hub 28 is embedded. The hub 28 is formed with a cone-shaped opening 30 into which the correspondingly shaped end of shaft 16 is inserted and releasably attached. The base body 27 is formed with a passage 34 extending transversely to the center axis of the opening 30 and acting as a slide bearing for the cylindrical part 32 of the wiper arm 24. The rear part of the passage 34 is radially extended into a chamber 36 for guiding a disc 38 which is concentrically fixed to the end of the wiper arm 24. A helical biasing spring 42 is provided between a shoulder 44 of the chamber 36 and the surface 40 of a disc 38. The spring thus pushes the wiper arm in axial direction into the chamber 36 until a transverse pin 46 mounted on the arm 24 enters an arresting groove 48 formed in the front face 50 of the base body 27. The arresting groove 48 is oriented so that in the arrested position the wiper blade 22 is in contact with window pane 12. If it is desired to replace the blade, the wiper arm 24 is pulled out in the direction of arrow 54 until the pin 46 is out of the range of the groove 48 and the wiper arm is free to rotate about its axis. In this manner, the blade holder 20 with the blade 22 is turned around into a position remote from the window in which the holder 20 can be released and the wiper blade exchanged without any problems. After the replacement of the blade, arm 24 is returned into its original working position and the arresting pin 46 is permitted again to engage the groove 48 in which it is held by the force of the biasing spring.

The embodiment according to FIG. 3 includes a base support part 127 into which a hub part 128 of metal is embedded to be secured to the driving shaft. In contrast to the embodiment of FIG. 2, the plug 138 in the form of a frustum or pyramid is fixed to the cylindrical end portion of the wiper rod 24 instead of the guiding disc 38. The corresponding recess 140 is formed in the end wall of chamber 136 received with a snug fit the pyramidal plug 138. Similarly as in the preceding example, biasing spring 142 is arranged between the base of the pyramidal plug 138 and an insert 129 which is inserted into the open end of the chamber 136 and is provided with a central cylindrical passage 134 for slidably supporting and guiding the cylindrical part of the wiper rods 24. The spring 142 rests on the inner face 144 of the insert 129. If it is desired to replace the wiper blade 22, the rod 24 is pulled in the direction of arrow 154 against the force of biasing spring 142 until the pyramidal plug 138 is displaced from its socket 140 thus permitting the rotation of arm 24 about its axis. During the blade replacing operation it is of advantage when the arm is rotated about 90° and released so as to permit the spiral spring 142 to arrest the pyramidal plug 138 again in its socket 140. In this manner the wiper blade holder is locked in an accessable position in which the holder can be readily removed or reinserted into its hook joint 18. Thereupon part 138 is again withdrawn from its socket, wiper blade 24 rotated back into its original working position in which the spring 142 again thrusts the plug into its socket.

In the modification according to FIG. 5, the operation is in principle the same as that in the embodiment of FIG. 3 except the arrangement of the plug and socket arresting or securing means 240 and 238. The pyramidal plug 240 is now secured with its smaller base to the end of the cylindrical part 232 of the wiper arm 24 and the recessed socket 240 matching the plug is formed in the end wall of the chamber 236 which is remote from the hub 228. A disc 250 with a central guiding pin 252 is inserted into the chamber 236 for supporting the biasing spring 242 which in this example rests on the larger base of the pyramidal plug 238. During the movement of the wiper arm 24, the guiding pin 252 enters a blind bore 255 in the center of the larger base of plug 238. If it is desired to replace the wiper blades 22, then the arm 24 is first axially pushed in the direction of arrow 254 against the force of the biasing spring 242 until plug 238 disengages its socket 240. When the arm is free to rotate about its axis and the replacement operation is effective in the same way as described above in FIG. 3.

All of the aforedescribed embodiments have the common feature that the wiper arm 24 together with the wiper blade holder 20 are first displaced in the direction of the center axis of the wiper blade 24 and then are either rotated into a locking position or into a blade replacing condition.

The continuous contact pressure of the wiper blade 22 against the pane 12 is produced by the resilient quality of material of the wiper arm 24 which may be made of synthetic material biassed in the direction against the pin 12.

It will be understood that each of the elements described above, or two or more together, may also find a useful application in other types of constructions differing from the types described above.

While the invention has been illustrated and described as embodied in specific examples of the wiping device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims.

What is claimed is:

1. A wiping device for window panes of a motor vehicle, comprising a support member rotatable about an axis and including an elongated passage extending transversely to said axis; a wiper arm projecting at one end thereof into said passage and being rotatable therein about its center axis; and releasable locking means arranged in said passage for releasably locking said arm in a fixed position relative to said support member.

2. A wiping device as defined in claim 1, wherein said passage has a circular cross-section and at least the part of the wiper arm projecting into said passage has a corresponding cross-section.

3. A wiping device as defined in claim 2, wherein said locking means includes a transverse pin attached to said wiper arm, a locking groove formed in said support member for receiving said pin in a predetermined angular position thereof and a biasing spring for urging in axial direction the wiper arm against said locking groove.

4. A wiping device as defined in claim 3, wherein said elongated passage is extended into a chamber, the end of said wiper arm projecting into said chamber and being connected to a guiding disc movable in said chamber.

5. A wiping device as defined in claim 3, wherein said locking pin is resiliently urged against said groove.

6. A wiping device as defined in claim 5; including a biasing spring for urging said pin into said locking groove.

7. A wiping device as defined in claim 6, wherein said biasing spring is a helical spring arranged in said chamber.

8. A wiping device as defined in claim 6, wherein said biasing spring is arranged between said guiding disc and a wall of said chamber to exert pressure on said wiper arm in its axial direction.

9. A wiping device as defined in claim 3, wherein said locking means includes a non-circular recess in an end wall of said elongated passage, a corresponding non-circular plug attached concentrically to the end of said wiper arm and a biasing spring arranged between said plug and the support member to urge the plug into said recess.

10. A wiping device as defined in claim 9, wherein said recess and said plug have, respectively, the shape of a pyramidal frustum.

11. A wiping device as defined in claim 10, wherein said wiper arm is attached to the center of the larger base of said pyramidal frustum, the elongated passage being closed at its open end by an insert provided with a hole for slidably guiding the end portion of said wiper arm, and a biasing spring being arranged around said end portion between said insert and the larger base of said plug, and the matching recess for said plug being formed in the other end of said passage.

12. A wiping device as defined in claim 10, wherein the end of the wiper arm being attached to the center of the smaller base of the pyramidal frustum plug, said elongated passage defining a first section for slidably supporting a portion of said wiper arm, a second section in the form of the pyramidal frustum recess communicating at its smaller base with said first section and matching the pyramidal frustum plug on said wiper arm, a third section in the form of a tubular chamber communicating with the second section, and said biasing spring being arranged in said third section.

13. A wiping device as defined in claim 12, wherein the larger base of the pyramidal frustum plug is provided with a central blind bore, and said third section of the passage housing a disc provided with a central pin engageable with said blind bore, and said biasing spring being a helical spring arranged around said pin between said disc and said pyramidal frustrum plug.

14. A wiping device as defined in claim 2, wherein said support member includes a base body formed with said elongated passage and including a hub body formed with a mounting opening for securing the support member to a rotatable driving element.

15. A wiping device as defined in claim 1, wherein the free end of said wiper arm is removably joined to a wiper blade holder.

16. A wiping device as defined in claim 15, wherein said free end of the wiper blade is connected to the wiper blade holder by a hook-type joint.

17. A wiping device as defined in claim 16, wherein said wiper arm is of a resilient material which is biassed in the direction toward said window pane.

* * * * *